W. T. ADDISON.
Cultivator.
No. 210,073.  Patented Nov. 19, 1878.
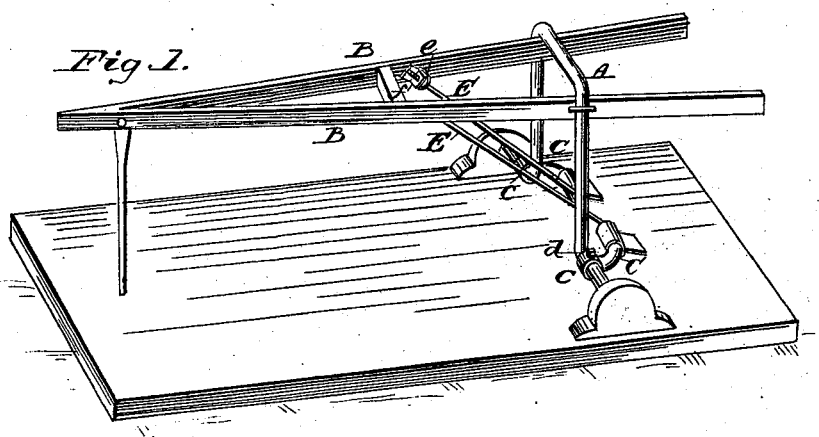
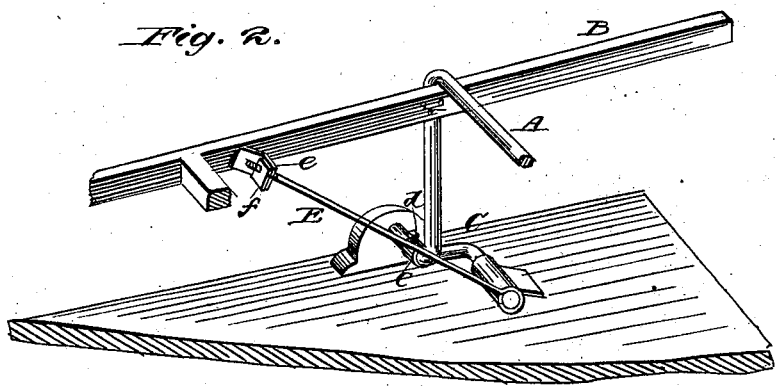
Witnesses:
Fred. G. Dieterich
George. Binkenburg
Inventor
William T. Addison.
by Louis Bagger & Co.
his Attorneys

UNITED STATES PATENT OFFICE.

WILLIAM T. ADDISON, OF NEW CASTLE, INDIANA.

IMPROVEMENT IN CULTIVATORS.

Specification forming part of Letters Patent No. 210,073, dated November 19, 1878; application filed September 23, 1878.

*To all whom it may concern:*

Be it known that I, WILLIAM T. ADDISON, of New Castle, in the county of Henry and State of Indiana, have invented certain new and useful Improvements in Cultivators; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view, showing the application of my improvement to certain portions of a cultivator; and Fig. 2 is a detailed view of my improvement in perspective.

The same part in the two figures is denoted by the same letter.

This invention appertains to certain improvements in cultivators, by which the shovels or plows may be adjusted relatively with the corn or other plant being cultivated—i. e., placed either nearer thereto, or vice versa, or adjusted with reference to the ground to enter the same any desired depth; and it consists of crank-shaped arms or bars adjustably connected to the axles of the machine and similarly braced or connected to the tongue or draft-beam, substantially as hereinafter more fully set forth.

In the drawings, A is the axle of the cultivator, of any suitable form or construction, from which extend forwardly the draft-beams B B. C C are arms or bars, having eyes c c, through which the axle spindles or arms pass, they being fitted upon the said spindles or arms and provided with set or adjusting screws d d. To these arms or bars are connected the cultivating shovels or plows in any suitable way. The inner ends of these arms or bars are connected or braced to the draft-beams or tongues B B, or to a single tongue or beam, as the case may be, by rods or braces E E, the upper ends of which are screw-threaded, pass through plates or projections e e, fastened to the beams B B, and nutted, as at f f, to permit of their corresponding adjustment with the vertical adjustment of the said arms or bars.

It will be observed that by loosening the screws d the arms or bars C C can be adjusted on the axle arms or spindles horizontally, either toward or away from each other, by which the plows or shovels can be placed nearer to or farther from the plants, as may be desired. The screws are tightened after the adjustment is made. These arms or bars can be moved, after loosening their screws, in the arc of a circle, to permit of the vertical adjustment of the plows or shovels, by which the latter may be set to enter the ground any desired depth, and held in such position by again tightening the set-screws d. With this adjustment of the axle-arms C C the adjusting-screws of the rods or braces E are also adjusted accordingly.

Having thus fully described my invention, I claim and desire to secure by Letters Patent of the United States—

1. In a cultivator, the combination, with its axle or beam, of the cranked arms or bars C, having set or adjusting screws d, substantially as and for the purpose specified.

2. The combination, with the beam or axle of a cultivator, of the cranked bar C, set-screw d, and adjustable rods or braces E, substantially as and for the purpose specified.

In testimony that I claim the foregoing as my own I have hereunto affixed my signature in presence of two witnesses.

WILLIAM T. ADDISON.

Witnesses:
A. S. BURR,
ELIAS NAY.